United States Patent Office 2,784,092
Patented Mar. 5, 1957

2,784,092
ANIMAL FEED SUPPLEMENT

Robert L. Frank, Lake Geneva, Wis., assignor to Ringwood Chemical Corporation, a corporation of Illinois No Drawing. Application September 30, 1953,
Serial No. 383,380

9 Claims. (Cl. 99—2)

This invention relates to new and improved supplements for animal feeds.

Within the past few years great progress has been made in elucidating nutrition fundamentals. It is now well established that the rate of growth of animals, especially when very young, is greatly influenced by minor components of the diet. Thus, the highest rate of growth is not obtained on a diet the protein of which is exclusively of vegetable origin. By supplementing such a diet with a relatively small amount of protein of animal origin, a marked increase in rate of growth is observed. The pronounced beneficial effect of this "animal protein factor" (APF) on rate of growth has been recognized for a number of years. Also, it has been recognized for a long period that the growth promoting effect of the APF is due, not to the protein itself, but rather to some other material associated with feeds of animal origin. With the isolation of vitamin $B_{12}$ in 1948 it was believed that the identity of the APF had been established. However, subsequent work has demonstrated that vitamin $B_{12}$ is incapable of supplying all of the favorable effects of the APF. On the other hand, a feed containing proteins that are exclusively of vegetable origin, if fortified with vitamin $B_{12}$ plus one of a comparatively limited group of materials frequently designated, in American nomenclature, as "APF supplements," is capable of furnishing the essential APF to chicks, young turkeys, shoats, young non-ruminating calves, and the like. In fact, such a doubly fortified vegetable feed is superior in promoting growth to feeds fortified with animal protein. Also, animal feeds containing proteins of animal and vegetable origin are greatly improved by the incorporation of an APF supplement therein. As would be expected, the most pronounced growth promoting effect of APF supplements is observed when one of these materials is incorporated in a feed the protein of which is exclusively of vegetable origin.

Known examples of APF supplements are extremely diverse materials chemically, embracing, for example, 4-hyroxy 3-nitrophenylarsonic acid; various sulfonamides such as sulfasuccidine and sulfaquinoxaline; antibiotics from fungi, such as penicillin; antibiotics from actinomycetes, such as chloramphenicol (chloromycetin), aureomycin, terramycin and streptomycin and antibiotics from bacteria such as bacitracin (ayfivin) and polymyxin (aerosporin, circulin Q 19).

Many hypotheses have been put forward to explain the action of these APF supplements and it is probable that no single mechanism explains the results observed.

It is quite unlikely that these materials act similarly to vitamins or hormones in view of the extremely varied chemical nature of materials known to be effective.

These materials may act, in part at least, by increasing the amount of known growth factors (e. g. vitamin $B_{12}$) available to the animal or by increasing the efficiency of utilization of available growth factors by the animal. Thus, the APF supplement may suppress certain strains of bacteria in the intestinal flora with resulting proligeration of bacterial strains capable of synthesizing growth factors. Bacillus megaltherium, for example, is known to synthesize vitamin $B_{12}$ and the growth of this organism is known to be increased by streptomycin. Or, the APF supplement may eliminate bacteria that destroy, inactivate or render growth factors unavailable to the animal. Eschericia coli is known to inactivate vitamin $B_{12}$ and aureomycin is capable of completely eliminating this organism from the gut.

Also, the APF supplement may act by eliminating a low grade infection in the animal that otherwise would produce toxic materials having a growth retarding effect. It has been definitely established that this mechanism accounts for at least part of the beneficial results observed following the use of APF supplements and explains many of the contradictory results appearing in the literature.

Obviously, the discovery of the APF supplement effect aroused much interest, especially in the United States where large supplies of vegetable protein (e. g. soy bean meal) are available but supplies of animal protein (e. g. fish meal) are comparatively limited. As a result, many investigators with long experience in the field of animal nutrition greatly increased the tempo of their work in the field, this increase requiring the construction of new facilities (pens, coops, et cetera) for housing additional test animals. Also, other investigators, who had previously done no work in the field, began to work therein and this again required the construction of new experimental facilities. When the results of this research began to appear in the literature it was seen that in many instances the data of different investigators were inconsistent and even directly contradictory. Thus, some investigators found that APF supplements resulted in a remarkable increase in rate of growth while others could detect no effect.

It has now been established that, in some instances at least, these inconsistent and contradictory results were the result of the influence, unappreciated by the investigators, of new versus old facilities on the growth rate of the animals under test. To demonstrate this, in one experiment, a single batch of day old chicks was separated at random into two groups of forty chicks each and one of these groups was sent to each of two laboratories, widely separated geographically. Previous to the experiment, poultry had only occasionally been present in one laboratory (laboratory G) while in the other (laboratory S) various experiments with poultry had been conducted continuously over a period of about ten years. A single batch of a high grade standard chick mash containing, intera alia, 5% fish meal, 1% cod liver oil and 5% dried whey, was divided between the two laboratories. The forty chick group of each laboratory was further divided at random into two twenty chick groups. In each laboratory one twenty chick group was fed the standard chick mash alone while the other group received the standard chick mash fortified with procaine penicillin at a rate of 40 mg. per kilogram of feed. Dry food and water were offered the chicks without restriction. At the end of 21 days the weights of the chicks were determined with the folowing results:

| | Laboratory G | | Laboratory S | |
|---|---|---|---|---|
| Wt. procaine penicillin, mg./kg. diet | 0 | 40 | 0 | 40 |
| Final weight, 21 days g | 188±8.2 | 188±12.1 | 168±6.4 | 192±6.2 |

It will be noted that in laboratory G the antibiotic had no beneficial effect on growth while in laboratory S a distinct improvement in growth was observed when the food contained the APF supplement. Also, it will be observed that all chicks in laboratory G and the penicillin fed chicks in laboratory S exhibited the same rate of growth. Accordingly, in laboratory S, penicillin did not actually stimulate growth in an absolute fashion but rather, in this laboratory, the chicks were unable to grow maximally in the absence of penicillin. This effect is believed due to some hitherto unrecognized low grade infection acquired by chicks in laboratory S (which had housed poultry continuously for about ten years) if fed a diet unfortified with penicillin. Further work demonstrated that this infection could be transmitted from chick to chick by placing infected chicks and healthy chicks in close proximity to each other; direct physical contact was not necessary for transmission. Obviously, the infection is not transmitted through the egg, otherwise the chicks in both laboratories would have been benefited by the penicillin fortified diet. However, additional experiments showed that in the absence of this infection (i. e. chicks grown in new facilities), chicks fed on all vegetable rations grew more rapidly when the basic diet was fortified with penicillin, indicating clearly that penicillin does more than merely eliminate the previously unrecognized low grade infection.

Experiments have also shown that pigs grown under good hygienic conditions do not respond to aureomycin. However, other pig experiments, conducted under more nearly conventional experimental conditions, have demonstrated a marked beneficial effect of APF supplements. Thus, on a diet fortified with penicillin, young pigs exhibited increased live weight gains, increased food consumption and increased efficiency of food utilization in comparison with control pigs fed on a diet unfortified with penicillin. These beneficial effects of penicillin fortified diets were observed regardless of whether the basic diet was all vegetable or contained animal protein.

Regardless of the exact mechanism of the action of APF supplements (and, as mentioned previously, it is probable that no single mechanism accounts for the effects observed) the fact remains that the beneficial effect of these supplements is highly useful since it is rare indeed that animals are reared under aseptic conditions. Whether APF supplements are true growth promoters or whether animals are merely unable to grow maximally in the absence of such supplements or whether both mechanisms are involved is immaterial. When APF supplements are supplied animals being reared under conditions conventionally encountered on the farm, an increased rate of growth is observed and this is the important fact to the grower of such animals and the explanation thereof is of no moment to him.

One object of my invention is to supply new and improved APF supplements for animal feeds.

Another object of my invention is to supply non-toxic APF supplements for animal feeds.

A further object of my invention is to supply stable APF supplements for animal feeds.

An additional object of my invention is to supply APF supplements for animal feeds that are more economical to use than APF supplements now in commercial use.

Yet another object of my invention is to supply APF supplements for animal feeds that also furnish the essential iodine requirements of animals.

A still further object of my invention is to supply new and improved animal feeds fortified with a stable, non-toxic and economical APF supplement that also furnishes the essential iodine requirements of animals.

Additional objects of my invention will become apparent as the description thereof proceeds.

I have discovered that 3,5-diiodosalicylic acid and functional derivatives of said acid are excellent APF supplements for animal feeds that are non-toxic, stable and economical to use. In addition, when employed as APF supplements, 3,5-diiodosalicylic acid and functional derivatives of said acid supply the essential iodine requirements of animals.

For the better understanding of my invention, the following illustrative but non-limiting examples thereof are given:

Example 1

Ten pigs approximately ten weeks old were divided at random into two groups of five pigs each. The groups were separately housed indoors in concrete pens. The pigs were offered food and water without restriction. The basic diet consisted of a complete ration containing 14% protein, including animal protein derived from 2% meat scraps, 1% fish meal and 1% condensed fish solubles, and was offered in the form of 3/16 inch pellets. The food supplied one group of pigs was fortified by Aurofac at a rate of six pounds per ton. Aurofac has a guaranteed aureomycin content of 1.8 g. per pound. Accordingly, the so fortified feed contained at least 5.4 mg. aureomycin per pound (12 mg./kg.). The feed supplied to the other group of pigs contained no aureomycin but instead was fortified with 3,5-diiodosalicylic acid at a rate of 6 mg. per pound (13.2 mg./kg.). At the end of 21 days on these diets the pigs were weighed. Weights and other experimental data are presented in the following tabulation:

| APF supplement | Aureomycin | 3,5-Diiodosalicylic acid |
|---|---|---|
| Quantity of APF supplement: | | |
| mg./lb. diet | 5.4 | 6.0 |
| mg./kg. diet | 12.0 | 13.2 |
| Average initial weight, lbs | 44.4 | 44.4 |
| Average final weight, lbs | 65.0 | 67.4 |
| Average wt. gain, lbs./day/pig | 0.98 | 1.10 |
| Average feed, lbs./day/pig | 3.15 | 3.10 |
| Lbs. feed/lb. wt. gain | 3.21 | 2.84 |

The above data show that on a basic diet fortified with 3,5-diiodosalicylic acid the average daily gain in weight and the efficiency of food utilization were both somewhat greater than obtained with the basic diet fortified with aureomycin. It is evident that 3,5-diiodosalicylic acid is at least as effective an APF supplement as aureomycin which is a highly effective and widely used APF supplement. The effectiveness of aureomycin as an APF supplement is shown by the data tabulated below. These data were obtained by dividing at random thirty pigs of uniform age into two groups of fifteen pigs each. These groups were housed as described in the previous example and one group was supplied with the basic diet set forth therein while the other group received this basic diet fortified with aureomycin at a rate of five mg. per pound (11.0 mg./kg.). Food and water were offered without restriction. The feeding experiment was continued for 56 days. From the data presented it will be noted that the pigs fed the aureomycin fortified basic diet exhibited a significantly higher rate of growth, a better appetite and an enhanced efficiency of food utilization in comparison with the pigs receiving the unfortified basic diet.

| APF supplement | None | Aureomycin |
|---|---|---|
| Quantity of APF supplement: | | |
| mg./lb. diet | | 5.0 |
| mg./kg. diet | | 11.0 |
| Average initial weight, lbs | 70.0 | 70.0 |
| Average final weight, lbs | 139.5 | 149.0 |
| Average wt. gain, lbs./pig/day | 1.24 | 1.41 |
| Average feed, lbs./day/pig | 4.29 | 4.63 |
| Lbs. feed/lb. wt. gain | 3.46 | 3.29 |

3,5-diiodosalicylic acid and is functional derivatives exhibit the APF supplement effect in a wide variety of feeds. The most pronounced effect is obtained with feeds, the protein of which is entirely of vegetable origin.

However, the beneficial effect of 3,5-diiodosalicylic acid and its functional derivatives is observed with feeds containing vegetable protein fortified with vitamin $B_{12}$ and also with feeds containing both vegetable and animal protein such as were used in Example 1.

Diets fortified with 3,5-diiodosalicylic acid or functional derivatives of said acid have a similar growth promoting effect on poultry such as chicks and young turkeys.

The APF supplement effect of 3,5-diiodosalicylic acid and functional derivatives thereof is observed over a wide range of dosages. The dosage required to attain the maximum APF supplement effect depends upon the composition of the basic diet, the species of animal being fed, and many other factors. An APF supplement effect may be observed at dosages as low as one mg. per pound of feed (2.2 mg./kg.) but to receive the maximum possible APF supplement effect a dosage several fold greater than this figure is usually required. In general, dosages in the range 0.0002% to 0.004% by weight, based on the feed, of 3,5-diiodosalicylic acid are employed, roughly equivalent to 1 to 20 mg. 3,5-diiodosalicylic acid per pound of feed (2.2 to 44 mg. 3,5-diiodosalicylic acid per kilogram of feed). Dosages above that required to give the maximum APF supplement effect do no harm, as will be brought out subsequently, but obviously dosages above that required to secure the maximum APF supplement effect are economically unsound.

As previously indicated, functional derivatives of 3,5-diiodosalicylic acid may be employed in place of the free acid to secure the APF supplement effect. Among such functional derivatives may be mentioned salts, esters, acid halides, et cetera, of 3,5-diiodosalicylic acid. The use of certain salts of the acid is especially advantageous in that by this method traces of a metal (or metals) essential to satisfactory animal nutrition may be supplied to the animal. If desired, a mixture of various metal salts of the acid may be employed whereby traces of a number of metals essential to satisfactory animal nutrition may be supplied to the animal. Obviously, functional derivatives of the acid, such as salts, esters, acid halides, et cetera, are converted to the free acid in the animal gut or, in some instances, even before the feed is consumed. Since these derivatives exist by virtue of the presence of the carboxyl group in the structure of 3,5-diiodosalicylic acid, in this specification and appended claims these derivatives are designated "functional derivatives of 3,5,-diiodosalicylic acid" or by similar terms of identical import.

3,5-diiodosalicylic acid and functional derivatives thereof, in addition to being at least as effective as aureomycin as APF supplements, have several advantages over this and other antibiotics employed for the purpose. 3,5-diiodosalicylic acid, for example, is non-volatile (M. P. 233–235° C.) and entirely stable both alone and when mixed with animal feeds. Thus, 3,5-diiodosalicylic acid, when exposed to air at room temperature for ninety days, exhibits no change in appearance, melting point or iodine content and the same is true of the acid after being held at 100° C. in an open dish in air for 72 hours. In fact, this acid shows no signs of decomposition until heated to its melting point at which temperature some darkening of the compound occurs. As is well known, the stability of many antibiotics leaves much to be desired. Furthermore, 3,5-diiodosalicylic acid is comparatively inexpensive, costing, weight for weight, only about 10 to 20% as much as aureomycin, terramycin and procaine penicillin, antibiotics widely used as APF supplements. The functional derivatives of the acid exhibit similar advantages.

Additionally, 3,5-diiodosalicylic acid and its functional derivatives are sources of the iodine requirements of animals. Animal feeds containing in the neighborhood of 0.15 mg. iodine per pound (0.33 mg./kg.) supply the essential iodine requirements of animals provided, of course, that the iodine is present in a biologically available form. The 3,5-diiodosalicylic acid fortified diet of Example 1 contained 3.9 mg. per pound (8.6 mg./kg.) iodine or more than 25 times the iodine requirements of the animals. To determine whether the iodine of 3,5-diiodosalicylic acid is in a form available to animals, the experiments of Examples 2 and 3 were conducted.

*Example 2*

Three groups, each containing ten albino rats, were separately housed and were supplied with 10 g. food per rat per day for a period of five weeks. Distilled water was available to the rats without restriction. One group was fed on a standard low iodine diet while the second group received the low iodine test diet fortified with potassium iodide in sufficient quantity to produce a diet containing 0.120 mg. iodine per pound (0.265 mg./kg.) while the third group was supplied with the low iodine diet fortified with sufficient 3,5-diiodosalicylic acid to give a diet containing 0.120 mg. iodine per pound (0.265 mg./kg.). This level of iodine fortification was chosen because it was known that growing rats fed a diet containing this amount of iodine (as potassium iodide) do not develop symptoms of iodine deficiency.

At the end of the five week feeding period the animals were weighed and sacrificed following which the thyroid glands were carefully dissected from the animals and weighed wet. The average weight of the thyroid gland per 100 g. body weight was 15.4 mg. for rats in the first group (fed on the low iodine diet), 10.0 mg. for rats in the second group (diet fortified with potassium iodide) and 11.9 mg. for rats in the third group (diet fortified with 3,5-diiodosalicylic acid).

Rats fed on a diet containing sufficient biologically available iodine to produce normal quantities of thyroxine have rather small thyroids, these weighing in the neighborhood of 10 mg./100 g. body weight. If insufficient iodine is available to the test animal the thyroid gland becomes enlarged. The above described experiment demonstrates that the iodine of 3,5-diiodosalicylic acid, while somewhat less available than the iodine of potassium iodide, is sufficiently available to supply the iodine requirements of animals especially when it is borne in mind that fortification with this compound to obtain the APF supplement effect supplies iodine in amounts many fold greater than employed in the present example.

*Example 3*

The rats of Example 2 received 0.0185 mg. iodine per rat per week which quantity, if biologically available, is sufficient to supply the iodine requirements of the animals. In the present example, new groups of albino rats were supplied with only 0.00525 mg. iodine per rat per week. This is a sub-minimal supply and even if all this iodine was biologically available a slight goiterous condition should be produced. By measuring the size of the thyroids after such a test a measure of the efficiency of utilization of sub-minimal amounts of iodine is obtained.

For five days of each week the test animals were allowed to consume the low iodine test diet without restriction. On two days of each week, each animal was supplied with 10 g. of the low iodine test diet fortified with 0.120 mg. iodine per pound (0.265 mg./kg.). Iodine was supplied in the form of potassium iodide to one group of ten test animals and in the form of 3,5-diiodosalicylic acid to a second group of ten test animals. It is seen that the animals of this test received only 2/7 the amount of iodine supplied the animals of Example 2 fed iodine enriched diets. Distilled water was available to all animals at all times.

After eight weeks on the above described regimens, the animals were weighed, sacrificed, the thyroids removed by careful dissection and weighed wet. The average weight of the thyroids of the animals given the sub-minimal iodine ration as potassium iodide was 12.18 mg./100 g. body weight while the average weight of the thyroids of animals given a sub-minimal iodine ration as 3,5-diiodosalicylic acid was 13.53 mg./100 g. body weight. It is evident that the efficiency of utilization of sub-minimal rations of iodine supplied as 3,5-diiodosalicylic acid is almost as great as the utilization of sub-minimal rations of iodine supplied by potassium iodide which is considered to be a standard and highly efficient method of furnishing iodine requirements.

Since 3,5-diiodosalicylic acid and functional derivatives thereof are excellent APF supplements and, in addition, are capable of supplying the iodine requirements of animals, especially at the high dosage levels employed for purposes of supplementing the APF, experiments were run to determine if the acid was acutely toxic or toxic after long continued use.

*Example 4*

Several albino rats were fed 250 mg. technical 3,5-diiodosalicylic acid per kilogram body weight, the compound being admixed with meat. Diarrhea of the test animals was the only symptom observed. This test feeding supplied about 60,000 times the daily dose required to maintain normal thyroid conditions in rats and is about 330 times the daily dose fed to the pigs of Example 1 to secure the APF supplement effect. Accordingly, it is safe to conclude that 3,5-diiodosalicylic acid is harmless in the amounts necessary to protect animals against iodine deficiency and to secure the APF supplement effect.

*Example 5*

Young albino rats were kept for five months (about one fourth the normal life span) on one of two diets, (a) one gram technical grade 3,5-diiodosalicylic acid per kilogram of standard test diet and (b) one gram refined 3,5-diiodosalicylic acid per kilogram of standard test diet. These diets and distilled water were supplied the animals without restriction.

The test animals gained weight normally and there was no interference with the reproductive processes. At the conclusion of the tests the animals were in excellent health. They were sacrificed and autopsied. There were no liver, kidney or intestinal abnormalities.

The 3,5-diiodosalicylic acid concentration in the above diets is 75 times as great as the 3,5-diiodosalicylic acid content of the pig diet of Example 1. Also, since 3,5-diiodosalicylic acid contains about 65% iodine by weight, the iodine concentration of these diets is almost 2500 fold as great as the rat diets of Example 2 and, in addition, the animals in the present example were supplied the much more strongly fortified diet without restriction while the supply of the weaker diet of Example 2 was limited to 10 g. per rat per day. Accordingly, it can be safely concluded that 3,5-diiodosalicylic acid produces no toxic symptoms in animals even if fed for extended periods at a concentration level far above that required to achieve the APF supplement effect and ever so much greater than that necessary to supply the iodine requirements of the animals.

The data presented in the above examples demonstrate that 3,5-diiodosalicylic acid is highly effective as an APF supplement and at the dosage levels employed to achieve the APF supplement effect supplies many times the iodine requirements of animals. Even at dosages many times greater than required to achieve the APF supplement effect the compound is not acutely toxic and even after long continued feeding at extremely high dosage levels gives rise to no symptoms of chronic toxicity. In addition, the compound is stable and relatively inexpensive. Similar results are obtained with functional derivatives of the acid which is to be expected since, as previously mentioned, these functional derivatives are reconverted to the free acid in the gut or, in some instances, even before consumption of the food containing them.

Be it remembered, that while this invention has been described in connection with specific details and specific examples thereof, these are illustrative only and are not to be considered limitations on the spirit or scope of said invention except in so far as these may be incorporated in the appended claims.

I claim:

1. The composition of matter comprising an animal feed containing proteinaceous material and having incorporated therein a material selected from the group consisting of 3,5-diiodosalicylic acid and functional derivatives of said acid.

2. The composition of matter comprising an animal feed containing proteinaceous material and having incorporated therein 3,5-diiodosalicylic acid.

3. The composition of matter comprising an animal feed containing proteinaceous material and having incorporated therein from about 0.0002 to about 0.004% by weight of 3,5-diiodosalicylic acid.

4. The composition of matter comprising an animal feed containing proteinaceous material, the protein content of which is exclusively of vegetable origin, admixed with 3,5-diiodosalicylic acid.

5. The composition of matter comprising an animal feed containing proteinaceous material, the protein content of which is exclusively of vegetable origin, admixed with from about 0.0002 to about 0.004% by weight of 3,5-diiodosalicylic acid.

6. The composition of matter comprising an animal feed containing proteinaceous material, the protein content of which is exclusively of vegetable origin, admixed with vitamin $B_{12}$ and 3,5-diiodosalicylic acid.

7. The composition of matter comprising an animal feed, the protein content of which is exclusively of vegetable origin, admixed with vitamin $B_{12}$ and from about 0.0002 to about 0.004% by weight of 3,5-diiodosalicylic acid.

8. The composition of matter comprising an animal feed containing protein of animal origin admixed with 3,5-diiodosalicylic acid.

9. The composition of matter comprising an animal feed containing protein of animal origin admixed with from about 0.0002 to about 0.004% by weight of 3,5-diiodosalicylic acid.

References Cited in the file of this patent

UNITED STATES PATENTS 2,510,486     Waletzky _____ June 6, 1950

OTHER REFERENCES

Chem. Abstract 35: 80034.
Chem. Abstract 37: 59964.